(12) United States Patent
Hashimoto et al.

(10) Patent No.: US 9,274,557 B2
(45) Date of Patent: Mar. 1, 2016

(54) STAND FOR ELECTRONIC DEVICE AND ELECTRONIC DEVICE

(71) Applicant: Kabushiki Kaisha Toshiba, Tokyo (JP)

(72) Inventors: Seiji Hashimoto, Musashino (JP); Hiromichi Suzuki, Koganei (JP); Ryosuke Saito, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 45 days.

(21) Appl. No.: 14/152,748

(22) Filed: Jan. 10, 2014

(65) Prior Publication Data

US 2014/0355196 A1    Dec. 4, 2014

(30) Foreign Application Priority Data

May 30, 2013   (JP) ................................. 2013-114414

(51) Int. Cl.
*H05K 5/00* (2006.01)
*G06F 1/16* (2006.01)

(52) U.S. Cl.
CPC ............ *G06F 1/1632* (2013.01); *G06F 1/1626* (2013.01)

(58) Field of Classification Search
CPC   G06F 1/1616; G06F 1/1681; F16M 2200/08; F16M 11/00; F16M 11/04; H05K 5/0234
See application file for complete search history.

(56) References Cited

U.S. PATENT DOCUMENTS

| 8,929,070 | B2 * | 1/2015 | Liu et al. ......................... 361/695 |
| 2011/0292584 | A1 | 12/2011 | Hung et al. |
| 2012/0287562 | A1 * | 11/2012 | Wu et al. ................... 361/679.01 |
| 2014/0133080 | A1 * | 5/2014 | Hwang et al. ............. 361/679.17 |

FOREIGN PATENT DOCUMENTS

| JP | 11-277581 | 10/1999 |
| JP | 11-288760 | 10/1999 |
| JP | 11-338578 | 12/1999 |
| JP | 2006-130791 | 5/2006 |
| JP | 2008-299630 | 12/2008 |
| JP | 2011-248872 | 12/2011 |

* cited by examiner

*Primary Examiner* — Hung Dang
(74) *Attorney, Agent, or Firm* — Rutan & Tucker LLP; William W. Schaal

(57) ABSTRACT

According to one embodiment, a stand for an electronic device, includes a first housing and a connector. The connector is configured to detachably connect to the electronic device and to be rotatably supported by the first housing. The electronic device includes a display face and a second housing. The second housing includes a first opening formed at an end thereof. The connector includes a support, a protrusion, and a base member. The support is configured to support the second housing from outside. The protrusion is spaced from the support and inserted into the first opening. The base member includes a first part configuring at least a portion of the support and a second part integrated with the first part and configuring at least a portion of the protrusion.

12 Claims, 16 Drawing Sheets

STAND FOR ELECTRONIC DEVICE AND ELECTRONIC DEVICE

CROSS-REFERENCE TO RELATED APPLICATIONS

This application is based upon and claims the benefit of priority from Japanese Patent Application No. 2013-114414, filed May 30, 2013, the entire contents of which are incorporated herein by reference.

FIELD

Embodiments described herein relate generally to a stand for an electronic device and an electronic device.

BACKGROUND

Conventionally, there is known an electronic device comprising a first housing, a connector, and a second housing. Here, the second housing is detachably connected to the connector that is rotatably supported on the first housing.

In an electronic device such as that mentioned above, preferably, for example, the second housing is connected to the connector even more steadily.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a stand for an electronic device, comprises a first housing and a connector. The connector is configured to detachably connect to the electronic device and to be rotatably supported by the first housing. The electronic device comprises a display face and a second housing. The second housing comprises a first opening formed at an end thereof. The connector comprises a support, a protrusion, and a base member. The support is configured to support the second housing from outside. The protrusion is spaced from the support and inserted into the first opening. The base member comprises a first part configuring at least a portion of the support and a second part integrated with the first part and configuring at least a portion of the protrusion.

An embodiment will be described below with reference to the accompanying drawings. In the embodiment, an electronic device will be exemplified as being configured as a personal computer. This is, however, not the only possible arrangement. The electronic device in the embodiment may be configured as one of various types of electronic devices, such as a smartphone, a portable telephone, a personal digital assistant (PDA), an electronic dictionary, a video display, and a TV telephone.

Figure 1:
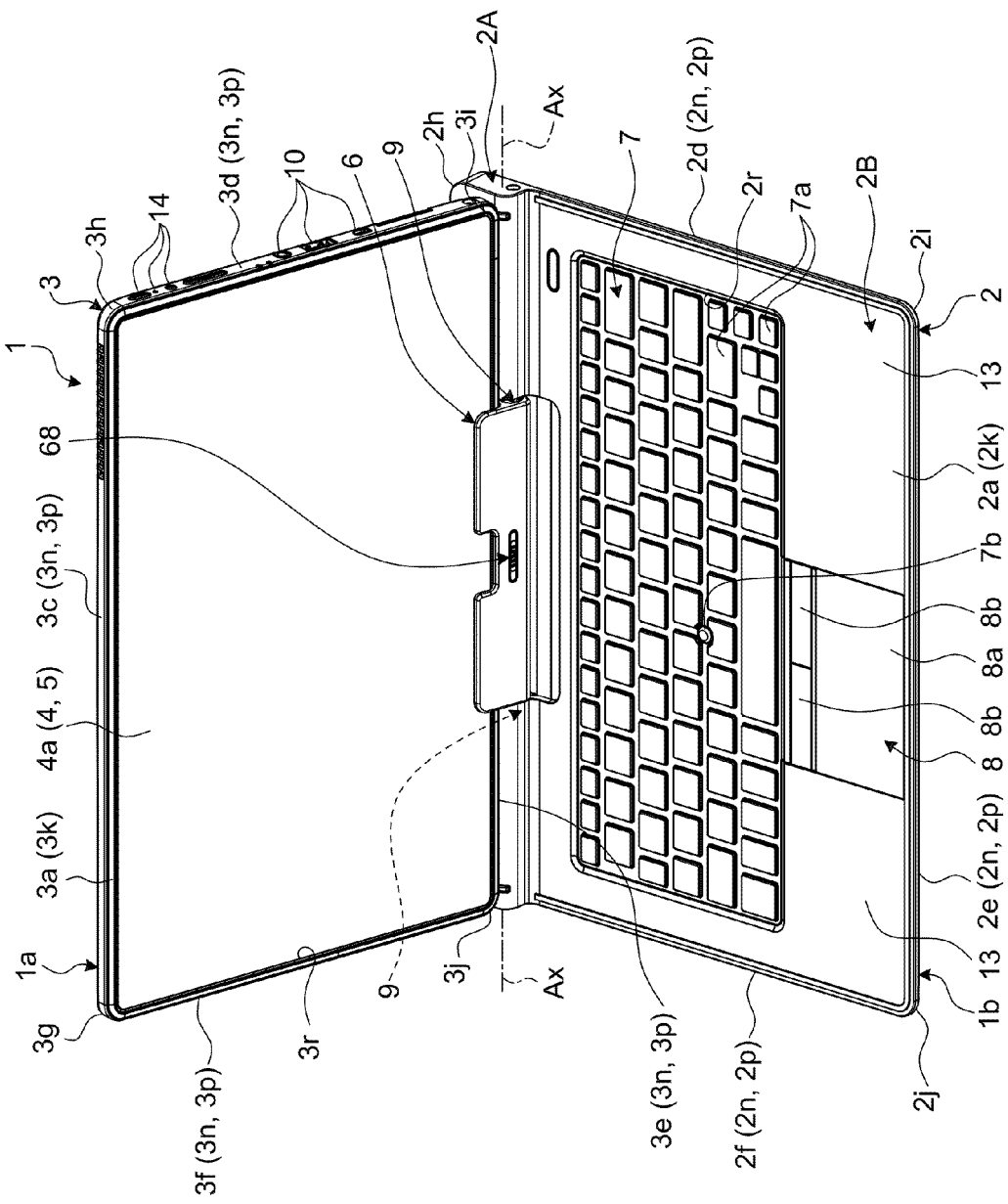
FIG. 1 is an exemplary perspective view of an electronic device in an opened state, according to an embodiment.
Figure 2:
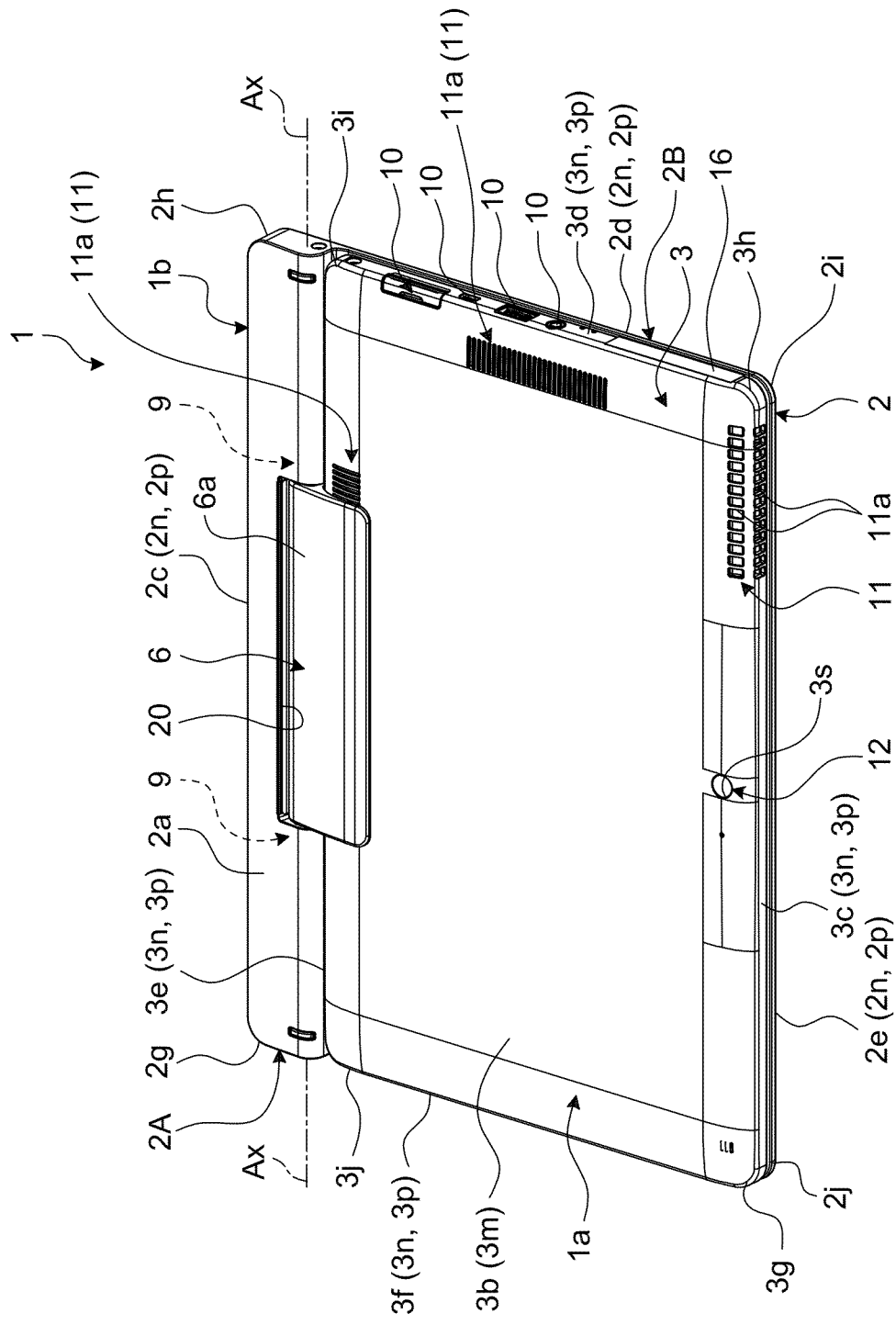
FIG. 2 is an exemplary perspective view of the electronic device in a folded state, in the embodiment.
Figure 4:
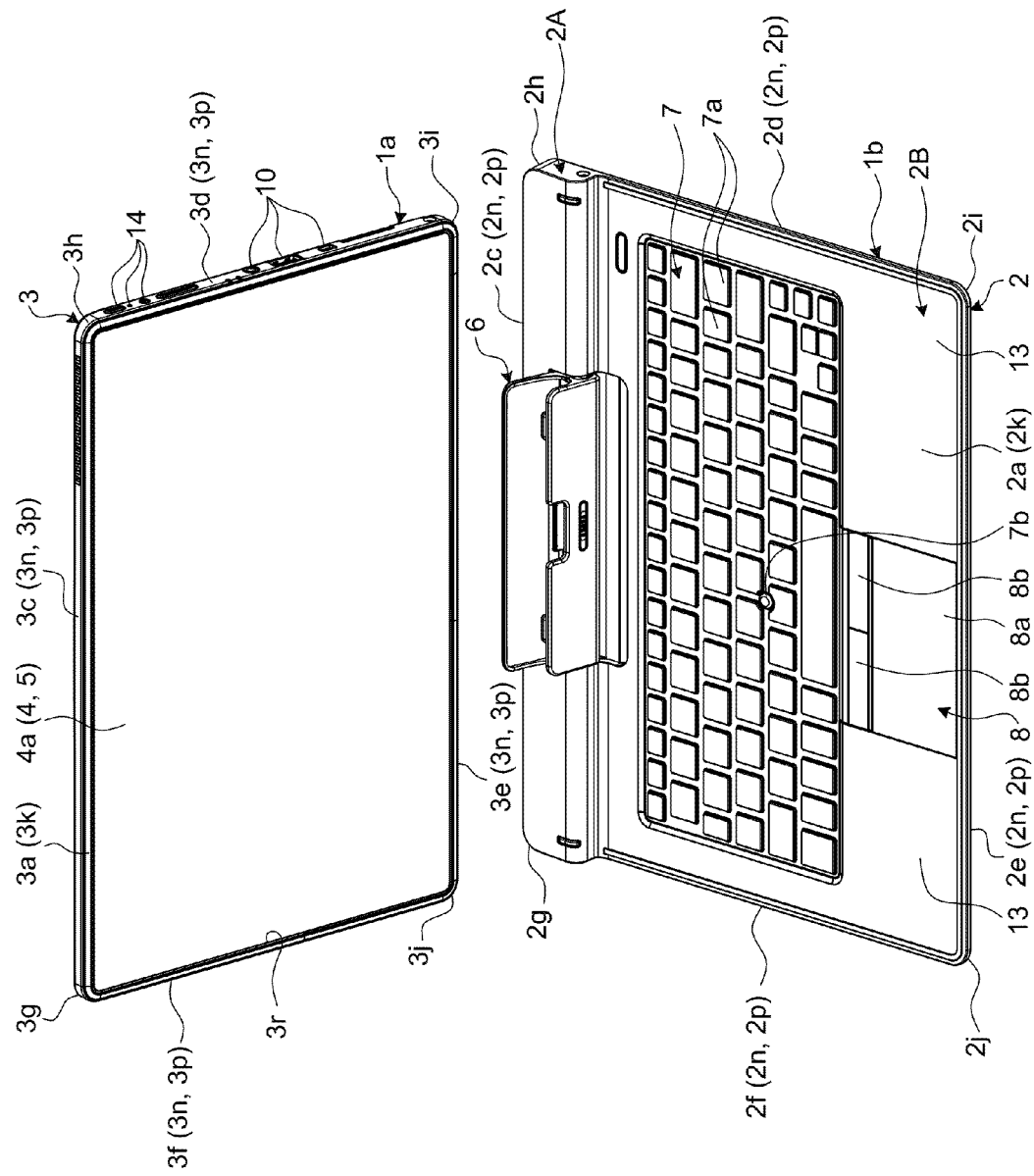
FIG. 4 is an exemplary perspective view of the electronic device in the opened state and from which a second housing is detached, in the embodiment.
Figure 5:
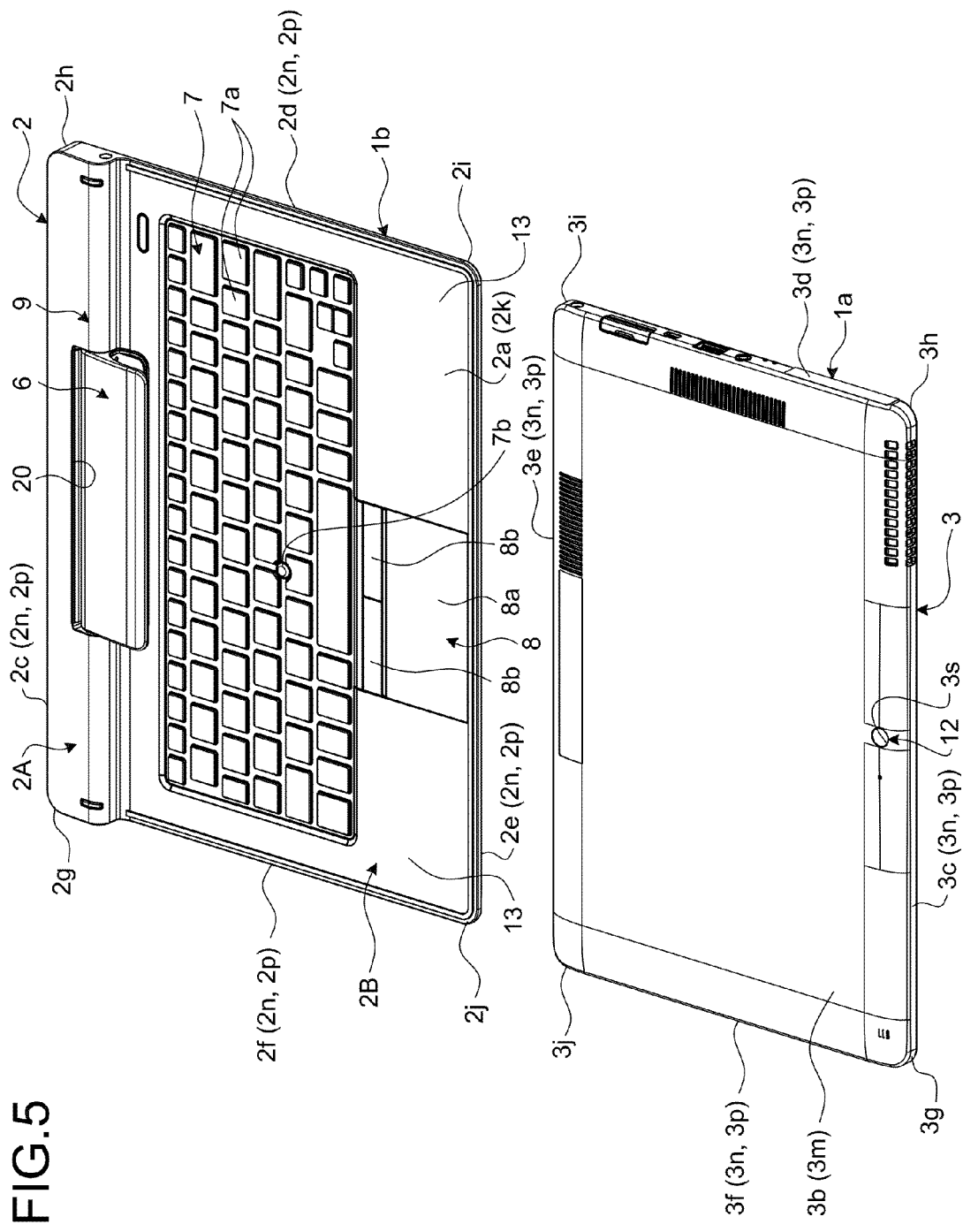
FIG. 5 is an exemplary perspective view of the electronic device in the folded state and from which the second housing is removed, in the embodiment.
Figure 6:
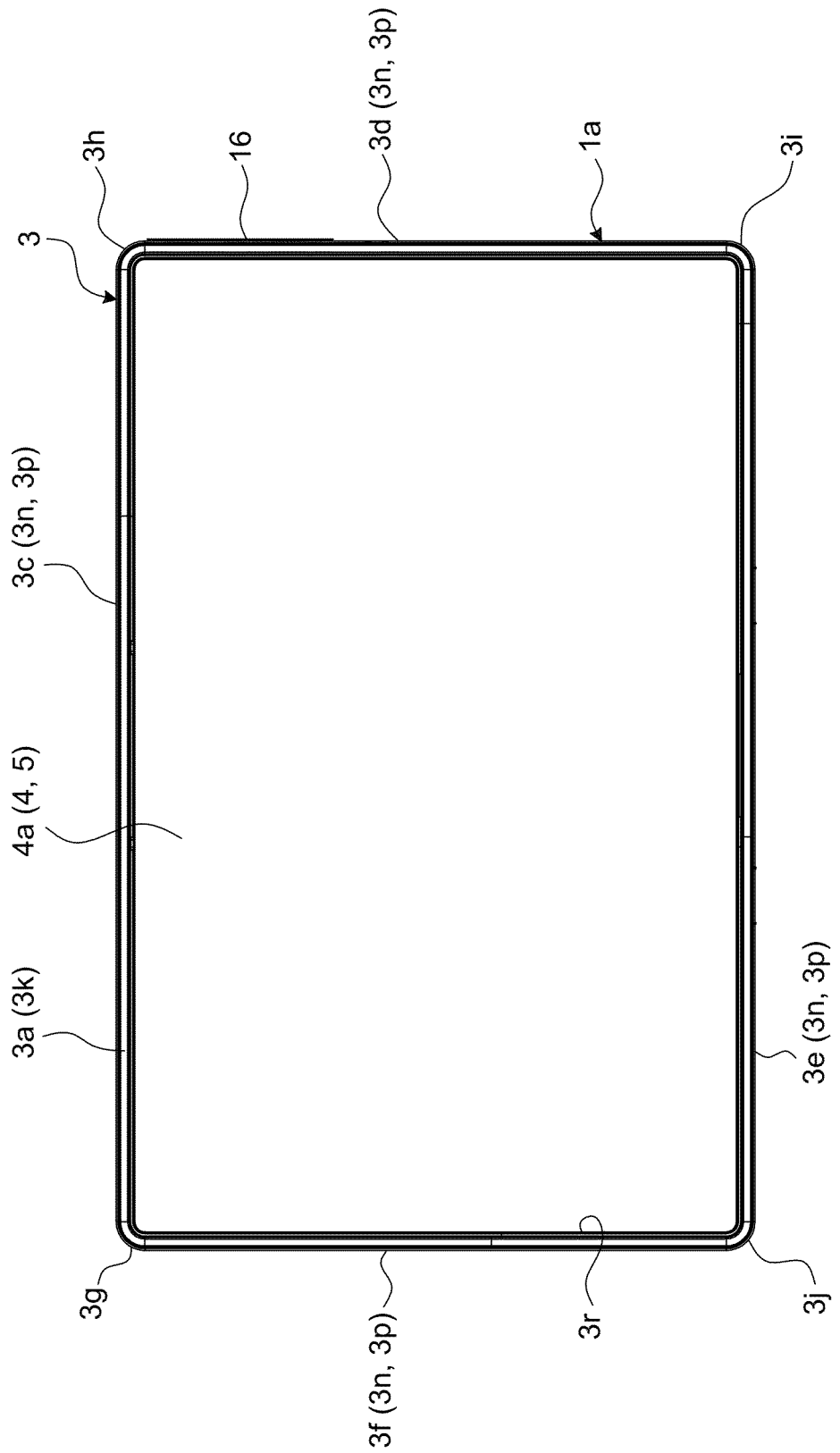
FIG. 6 is an exemplary front view of the second housing of the electronic device in the embodiment.
Figure 7:
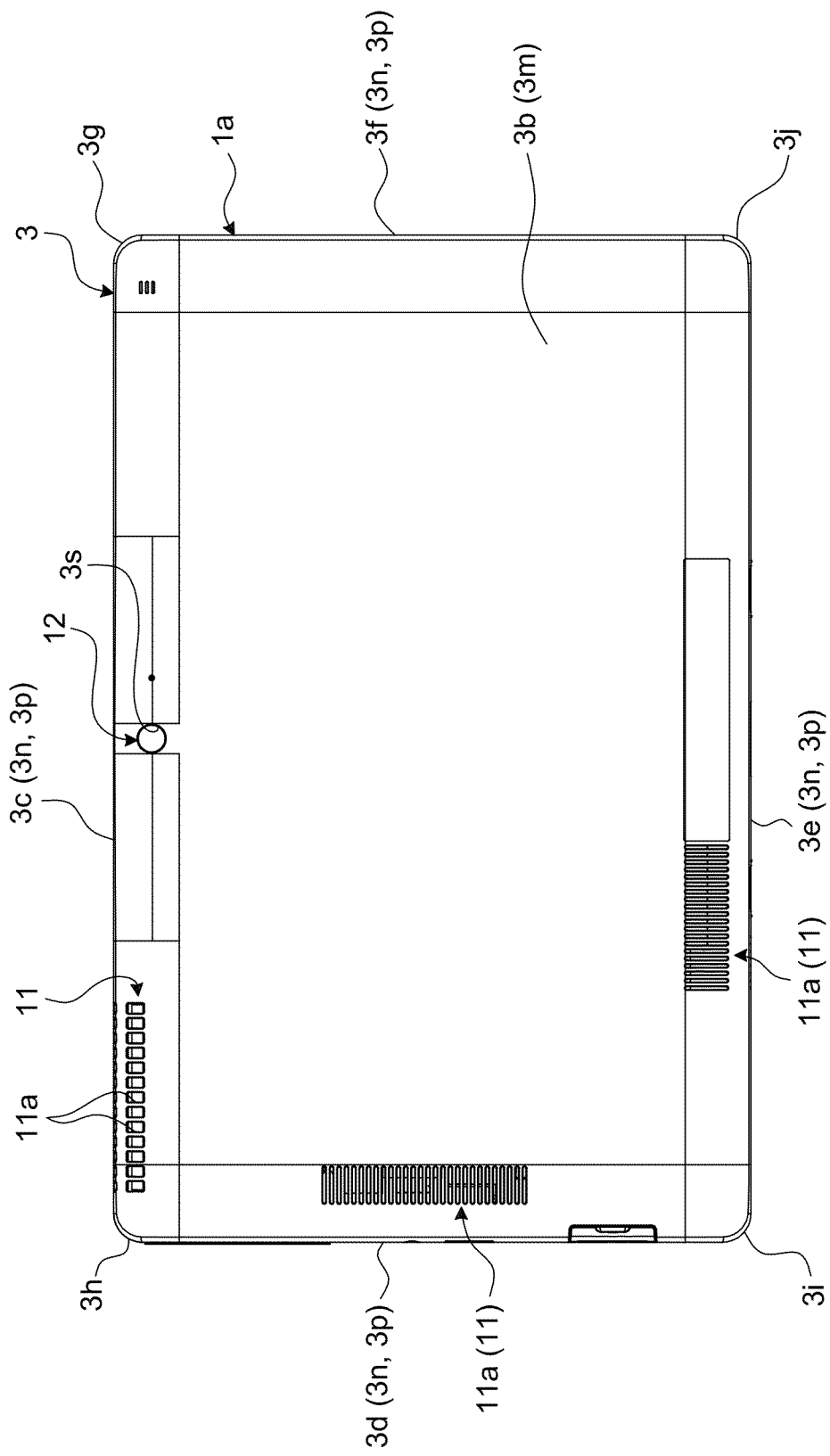
FIG. 7 is an exemplary rear view of the second housing of the electronic device in the embodiment.
Figure 8:
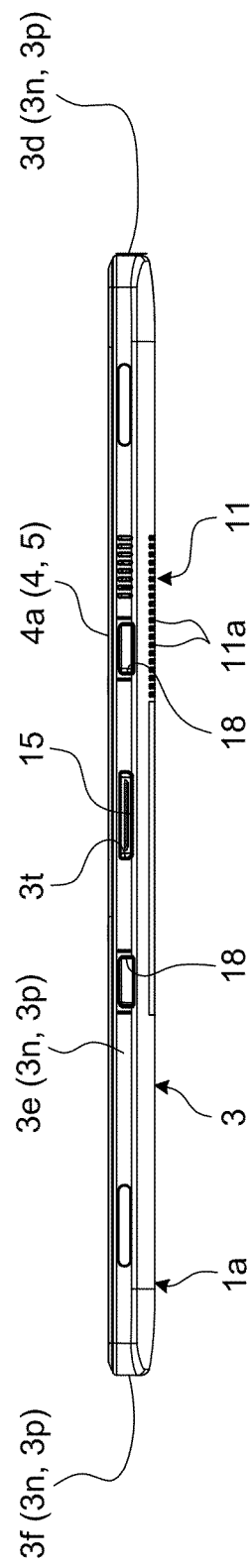
FIG. 8 is an exemplary side view of the second housing of the electronic device in the embodiment.
Figure 9:
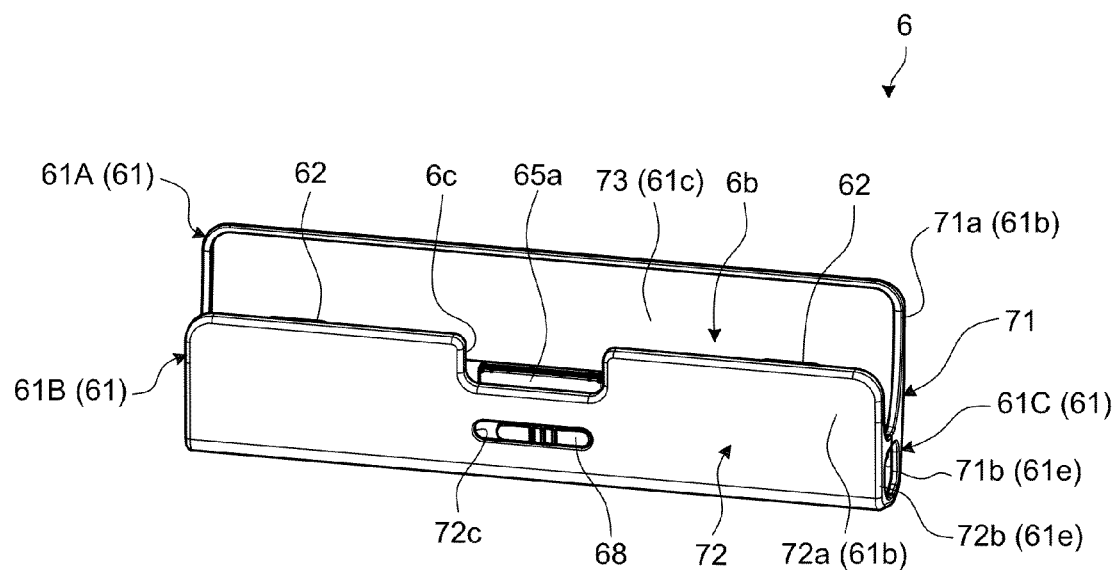
FIG. 9 is an exemplary perspective view of a connector of the electronic device in the embodiment.
Figure 10:
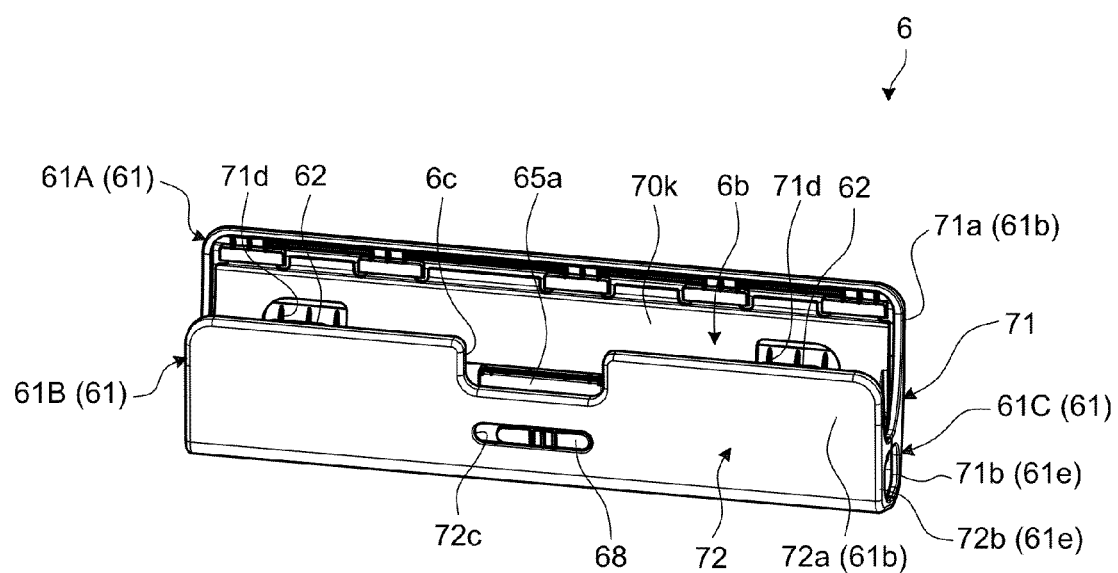
FIG. 10 is an exemplary perspective view of the connector of the electronic device from which a cover is detached, in the embodiment.
Figure 11:
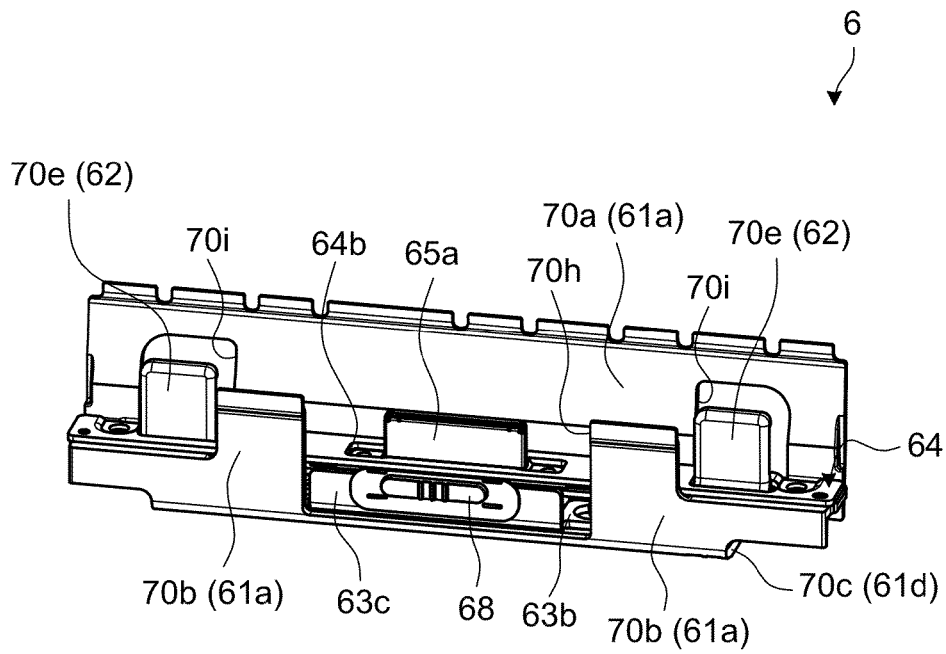
FIG. 11 is an exemplary partial perspective view of an internal structure comprised in the connector of the electronic device, and illustrating a condition in which a hook is housed in an opening, in the embodiment.
Figure 12:
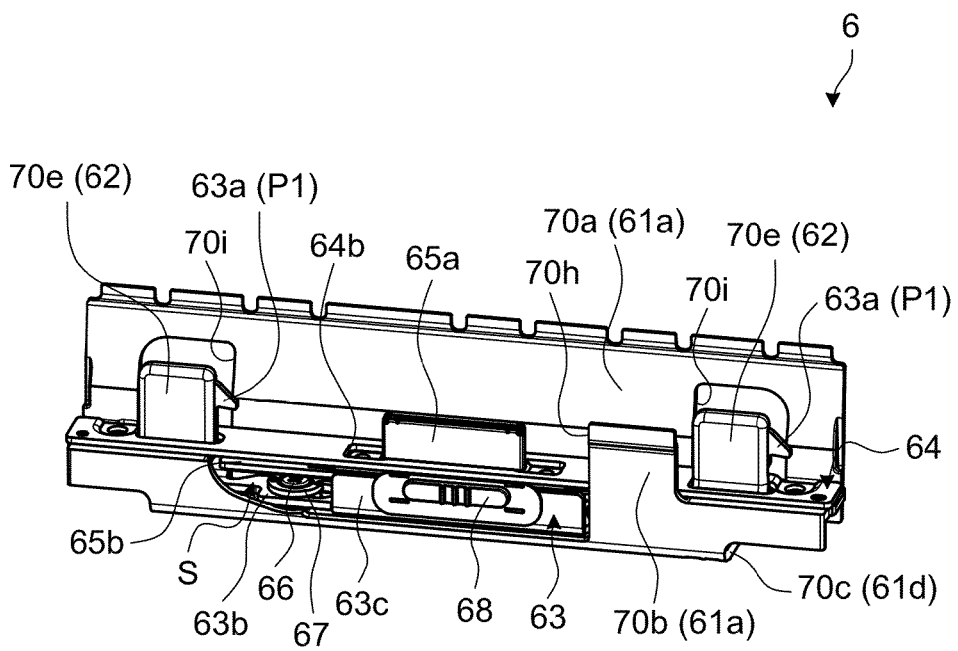
FIG. 12 is an exemplary partial perspective view (a partial cutaway view) of the internal structure comprised in the connector of the electronic device, and illustrating a condition in which the hook protrudes from the opening, in the embodiment.

An electronic device 1 exemplified in an embodiment comprises a device 1a (an electronic device) and a device 1b (an electronic device) as illustrated in FIGS. 1 and 2. The device 1a comprises, for example, a housing 3 (a second housing) and a display 4. The device 1a is, for example, a tablet-type personal computer. The device 1b comprises, for example, a housing 2 (a first housing), a key module 7, and an input operating portion 8. The device 1a is detachably connected to the device 1b (of a connector 6) (refer to FIGS. 4 and 5). The device 1b can support the device 1a connected to the connector 6 in an upright position. Specifically, the device 1b is an exemplary stand (a supporting portion, a holding portion) of the device 1a. The electronic device 1 can be used in a tablet mode (refer to FIGS. 6 to 8) in which the device 1a is not connected to the device 1b and a clamshell mode (a notebook mode; refer to FIG. 1) in which the device 1a is connected to the device 1b.

The connector 6 is supported on the device 1b (housing 2) via a hinge 9 pivotally about a pivot axis Ax. In the clamshell mode, the connector 6 on which the housing 2 is mounted is pivotally rotated about the pivot axis Ax, which allows the electronic device 1 to be transformed between an opened state (refer to FIG. 1) in which the housing 2 and the housing 3 are extended and a folded state (refer to FIG. 2) in which the housing 2 and the housing 3 are folded. As illustrated in FIG. 2, in the folded state, the housing 2 and the housing 3 overlap each other in a thickness direction. In the folded state, a face 2a of the housing 2 and a face 3a of the housing 3 overlap each other in a condition of facing each other and (a display screen 4a of) the display 4, the key module 7, the input operating portion 8, and the like are hidden in the housing 2 and the housing 3. In the opened state, the face 2a of the housing 2 and the face 3a of the housing 3 are exposed, which allows (the display screen 4a of) the display 4, a touch panel 5, the key module 7, the input operating portion 8, and the like to be usable (visible or operable).

In the clamshell mode, electric components (e.g., a circuit board, not illustrated) housed inside the housing 3 of the device 1a are electrically connected to electric components (e.g., the key module 7 and the input operating portion 8) housed inside the housing 2 of the device 1b via a conductor of, for example, a connector 15 (refer to FIG. 8), a harness (not illustrated), and a flexible printed wiring board (not illustrated). In the clamshell mode, the device 1b expands functions of the device 1a. Specifically, the device 1b is an exemplary function expansion device (cradle, dock, docking station). It is noted that the housing 2 of the device 1b can house therein, for example, a battery, a connector, and a circuit board. Data obtained by an input operation through, for example, the key module 7 or the input operating portion 8 may be input to the circuit board in the housing 3 via a wireless communication mechanism (e.g., a transmission/reception circuit and an antenna; not illustrated). In this case, the connector 15 can be omitted.

For example, in the first embodiment, the housing 3 (second housing) of the device 1a supports the display 4 (a display module, a display, a panel, a display component) comprising the display screen 4a (a display face). The housing 3 houses therein at least a portion of the display 4.

For example, in the embodiment, as is known from FIGS. 1 and 2, the housing 3 exhibits a quadrilateral (for example in the embodiment, a rectangular) appearance in a front elevational view and a rear elevational view. Additionally, the housing 3 is formed into a flat rectangular parallelepiped that is thin in a front-to-rear direction (in a thickness direction of the housing 3, in a direction normal to the display screen 4a). The housing 3 has the face 3a (a front face, a fore face, a surface, a face portion) and a face 3b (a back face, a rear face, a reverse face, a face portion) opposite thereto. The face 3a and the face 3b face directions opposite each other (for example in the embodiment, in parallel with each other). The housing 3 has four ends 3c to 3f (sides, edges) and four corners 3g to 3j (pointed portions, bent portions, ends) in the front elevational view. The ends 3c, 3e are exemplary long sides. The ends 3d, 3f are exemplary short sides. In addition, the housing 3 has four faces 3p (side faces, extended faces, face portions) extending across the face 3a and the face 3b. It is noted that the faces 3p are not necessarily demarcated by, for example, mutually distinctly pointed corners and may be smoothly connected to each other byway of, for example, bent portions.

In addition, the housing 3 has a wall 3k (a part, a plate, a frame, a fore wall, an front wall, a top wall) disposed on the front side and a wall 3m (a part, a plate, a rear wall, a reverse wall, a bottom wall) disposed on the rear side. The wall 3k has a quadrilateral opening 3r via which a user can view the display screen 4a from the front side (a forward side). The wall 3k surrounds a peripheral edge portion of the display 4 (display screen 4a). The wall 3k is shaped as a quadrilateral frame and plate. The wall 3m is shaped as a quadrilateral plate. The wall 3m covers a reverse face (not illustrated) disposed on the side opposite the display screen 4a of the display 4. Additionally, the housing 3 has four walls 3n (parts, plates, side walls, end walls, vertical walls, extended portions) extending across the wall 3k and the wall 3m. The walls 3n cross the walls 3k, 3m to extend and cover side faces (not illustrated) of the display 4. It is noted that the walls 3k, 3m and the walls 3n are not necessarily demarcated by, for example, mutually distinctly pointed corners and may be smoothly connected to each other by way of, for example, bent portions. Additionally, a cross section between the walls 3k, 3m and the walls 3n may be a continuous arc. The walls 3k, 3m extend substantially in parallel with each other. It is noted that the housing 3 may have walls (parts, plates, frames, intermediate walls, inner walls, middle plates, middle frames, third walls; not illustrated) disposed between the wall 3k and the wall 3m.

For example, in the first embodiment, the housing 3 may be formed to comprise a plurality of members (housing members, components, divided bodies) combined with each other. The members that constitute the housing 3 can be, for example, synthetic resin materials (e.g., plastic, engineering plastic) and metal materials (e.g., aluminum alloys, magnesium alloys, stainless steels).

For example, in the first embodiment, the display 4 exhibits a quadrilateral (for example in the first embodiment, a rectangular) appearance in a front elevational view. Additionally, the display 4 is formed into a flat rectangular parallelepiped that is thin in a front-to-rear direction (in the thickness direction of the housing 3). The display 4 may, for example, be a liquid crystal display (LCD) or an organic electro-luminescent display (GELD). It is noted that the display 4 can be a flexible display. Additionally, the display screen 4a of the display 4 is covered with a transparent portion of the touch panel 5 (a touch sensor, an input operating panel). It is noted that the touch panel 5 may even be configured as an in-cell touch panel built into the display 4.

For example, in the first embodiment, a camera module 12 (a camera unit, a camera assembly, a camera, an imaging device) is housed on a rear side (a back side, the side behind, the wall 3m side, the side opposite the display screen 4a) of the display 4 inside the housing 3. The camera module 12 is exposed via an opening 3s in the wall 3m of the housing 3. Additionally, an electric component (a component, a first electric component; not illustrated) different from the camera module 12 can be housed inside the housing 3. The electric component may, for example, be a circuit board (a board, a printed board, a control board), a wire (e.g., a cable, a harness, a flexible cable, a flexible printed wiring board), a battery module (a battery, an assembled battery, a cell, a module, a battery pack, a battery unit), a speaker module (a speaker unit, a speaker assembly, a speaker, a voice input device), and an antenna module (an antenna unit, an antenna assembly, an antenna, a first transmitter and receiver). These electric components can be electrically connected to each other via wires.

Figure 3:
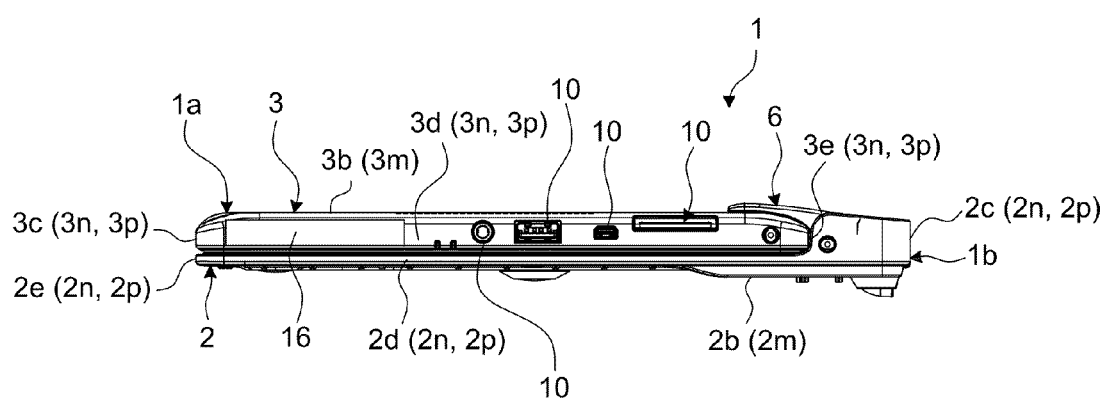
FIG. 3 is an exemplary side view of the electronic device in the folded state, in the embodiment.

For example, in the first embodiment, the face 3b or the face 3p of the housing 3 has a vent port 11 through which air is drawn or discharged for, for example, cooling the above-mentioned electric components. The vent port 11 may for example be configured as a portion of a plurality of small holes 11a grouped together and formed in the wall 3m or the wall 3n. Connectors 10 and operating portions 14 are disposed in the face 3p of the end 3d of the housing 3. The connectors 10 may, for example, be a power cable connector, a universal serial bus (USB) connector, a card connector, an earphone connector, and a microphone connector. The operating portions 14 may, for example, be a pushbutton, a push switch, a slide switch, a pointing device, and a dial. The operating portions 14 can for example be covered in a cover 16 disposed movably (removably or slidably) relative to the housing 3 as illustrated in FIGS. 2 and 3. In addition, the face 3p of the end 3e of the housing 3 has the connector 15 (see FIG. 8). The connector 15 is disposed at a substantially central portion of the end 3e of the housing 3 in a longitudinal direction (in a direction extending along the end 3e) and exposed from an opening 3t. The connector 15 can be connected to a connector unit 65 of the connector 6. In addition, the face 3p of the edge 3e has a plurality of (two, for example in the first embodiment) openings 18 (first openings). The openings 18 are spaced apart from each other across the connector 15 in the end 3e of the housing 3 in the longitudinal direction (in the direction extending along the end 3e). The connector 6 has protrusions 62 inserted into the openings 18.

For example, in the first embodiment, the battery module is configured as a lithium ion secondary battery. For example, in the first embodiment, the battery module can supply the electric components mounted in the housing 3 in addition to the display 4 via, for example, wires with power source electricity required for operations, e.g., for the electronic device 1 to display an image or output voice. In addition, the battery module can also supply, though not illustrated, electricity to, for example, an external device connected electrically to a circuit board or the like via a wire, a conductor (a bus bar), a connector, or the like.

For example, in the first embodiment, a plurality of components, such as a central processing unit (CPU), a graphic controller, a power source component, a platform controller hub (PCH), a memory slot connector, an LCD connector, an input/output (I/O) connector, a power source coil, an element, a universal serial bus (USB) connector can be mounted on the circuit board.

Additionally, for example, in the embodiment, as is known from, for example, FIGS. 1 and 2, the housing 2 (the first housing) of the device 1b exhibits a quadrilateral (for example in the embodiment, a rectangular) appearance in a front elevational view and a rear elevational view. Additionally, the housing 2 is formed into a flat rectangular parallelepiped that is thin in a vertical direction (in a thickness direction of the housing 2). The housing 2 has the face 2a (a front face, an upper face, a surface, a face portion) and a face 2b (a back face, a bottom face, a reverse face, a face portion; refer to FIG. 3) opposite thereto. The face 2a and the surface 2b face directions opposite each other (for example in the embodiment, in parallel with each other). The housing 2 has four ends 2c to 2f (sides, edges) and four corners 2g to 2j (pointed portions, bent portions, ends) in the front elevational view. The ends 2c, 2e are exemplary long sides. The ends 2d, 2f are exemplary short sides. In addition, the housing 2 has four faces 2p (side faces, extended faces, surface portions) extending across the face 2a and the face 2b. It is noted that the faces 2p are not necessarily distinctly demarcated by, for example, pointed corners and may be smoothly connected to each other by way of, for example, bent portions.

For example, in the first embodiment, the housing 2 has a wall 2k (a part, a plate, a frame, an upper wall, an front wall, a top wall) disposed on the front side and a wall 2m (a part, a plate, a lower wall, a reverse wall, a bottom wall; refer to FIG. 3) disposed on the rear side. The electronic device 1 can be used in a posture in which the face 2b (the wall 2m) of the housing 2 is placed on a placement surface not illustrated in a posture of the face 2b extending along the placement face. The wall 2k is shaped as a quadrilateral frame and plate. The wall 2m is shaped as a quadrilateral plate. Additionally, the housing 2 has four walls 2n (parts, plates, side walls, end walls, vertical walls, extended portions) extending across the wall 2k and the wall 2m. The walls 2n cross the walls 2k, 2m. It is noted that the walls 2k, 2m and the walls 2n are not necessarily separated by, for example, distinctly pointed corners and may be smoothly connected to each other by way of, for example, bent portions. Additionally, a cross section between the walls 2k, 2m and the walls 2n may be a continuous arc. The walls 2k, 2m extend substantially in parallel with each other. It is noted that the housing 2 may have walls (parts, plates, frames, intermediate walls, inner walls, middle plates, middle frames, third walls; not illustrated) disposed between the wall 2k and the wall 2m.

For example, in the first embodiment, the housing 2 may be formed to comprise a plurality of members (housing members, components, divided bodies) combined with each other. The members that constitute the housing 2 can be, for example, synthetic resin materials (e.g., plastic, engineering plastic) and metal materials (e.g., aluminum alloys, magnesium alloys, stainless steels).

For example, in the embodiment, the housing 2 comprises a first part 2A and a second part 2B. The first part 2A is disposed at the end 2c of the housing 2 and extends slenderly across the end 2d and the end 2f. The second part 2B is a quadrilateral portion in a plan view (in a line of sight in the thickness direction) disposed away from the first part 2A. The second part 2B has a thickness thinner than a thickness of the first part 2A. Specifically, a shoulder is formed between the first part 2A and the second part 2B and the device 1b has a recess with the second part 2B defined as a bottom portion. With the electronic device 1 in the folded position, the device 1a overlaps the second part 2B. Specifically, the recess having the second part 2B defined as the bottom portion is a space (an opening) that houses therein the device 1a with the electronic device 1 in the folded position. The second part 2B comprises, for example, the key module 7 (an input operating portion, a first input operating portion, an input receiving portion, an input portion) and the input operating portion 8 (a second input operating portion, an input receiving portion, an input portion).

For example, in the first embodiment, the wall 2k of the second part 2B has an opening 2r having a slender quadrilateral (rectangular) shape extending along the end 2e. The key module 7 (a key unit, a keyboard module, a keyboard unit) is exposed from the opening 2r. The key module 7 comprises a plurality of keys 7a (operating portions) and a stick 7b (an operating portion, a pointing device). The keys 7a are supported by a supporting member (not illustrated) so as to pop up therefrom and down thereinto (to be projected therefrom and retracted thereinto, to be displaceable). The stick 7b is supported swingably (movably) by the supporting member. For example, in the first embodiment, the opening 2r (the key module 7) is disposed on a side closer to the first part 2A side between the end 2e and the first part 2A.

For example, in the first embodiment, the input operating portion 8 is disposed on the wall 2k of the second part 2B. The input operating portion 8 is disposed between the opening 2r (the key module 7) and the end 2e at a substantially central portion of the wall 2k in the longitudinal direction (in a direction extending along the end 2e). The input operating portion 8 comprises a pointing device 8a (a touch pad, a touch panel) and at least one click button 8b (a button). Specifically, the pointing device 8a has a quadrilateral (for example in the first embodiment, a rectangular) shape and is disposed on the end 2e side. The at least one click button 8b has a quadrilateral (for example in the first embodiment, a rectangular) shape and is disposed on the opening 2r side. In the first embodiment, the at least one click button 8b comprises a plurality of (two, for example in the first embodiment) click buttons 8b disposed in juxtaposition with each other along the end 2e. In addition, palm rests 13 (placement portions) are disposed on both sides of the input operating portion 8 on the wall 2k (on both sides of the wall 2k in the longitudinal direction). The palm rests 13 assume portions on which the user rests his or her hands and are formed into flat surfaces (plate shapes).

For example, in the first embodiment, an electric component (a component, a second electric component; not illustrated) can be housed (can be provided) inside the first part 2A. The electric component may, for example, be a circuit board (a board, a printed board, a control board), a battery module (a battery, an assembled battery, a cell, a module, a battery pack, a battery unit), a speaker module (a speaker unit, a speaker assembly, a speaker, a voice input device), an antenna module (an antenna unit, an antenna assembly, an antenna, a second transmitter/receiver), a connector, and an operating portion. The connector may, for example, be a power cable connector, a universal serial bus (USB) connector, a card connector, an earphone connector, and a microphone connector. The operating portion may, for example, be a pushbutton, a push switch, a slide switch, a pointing device, and a dial. In the first embodiment, the electric components other than the key module 7 can be housed in the first part 2A. As a result, in the first embodiment, for example, the housing 2 can be built thinner compared with a case in which the key module 7 and the electric components other than the key module 7 are housed in the second part 2B in a manner of overlapping each other in the thickness direction of the second part 2B.

For example, in the first embodiment, the antenna module (not illustrated) of the device 1b can transmit data to, and receive data from, the antenna module (not illustrated) of the device 1a through wireless communication therewith. The data transmitted from the antenna module of the device 1b to the antenna module of the device 1a is, for example, data according to (indicating) an input operation performed on the key module 7. Alternatively, the data transmitted from the antenna module of the device 1a to the antenna module of the device 1b is, for example, data that causes the speaker module of the device 1b to output voice. Thus, for example, in the first embodiment, the electric component of the device 1b can function as an input section or an output section of the device 1a (corresponding to a controller (not illustrated) thereof).

For example, in the first embodiment, the first part 2A has a recess 20 (an opening, a groove, a recessed groove, a cutout, a housing). The recess 20 is disposed at a boundary between the first part 2A and the second part 2B. The recess 20 is formed into a cutout that opens toward the end 2e side. As illustrated in FIG. 2, the connector 6 has its part (proximal portion) inserted into the recess 20. The connector 6, having its proximal portion connected to the hinge 9 in the first part 2A, is rotatably supported by the housing 2. As such, in the first embodiment, the part (proximal portion) of the connector 6 is covered in the first part 2A that exhibits a U-shaped (C-shaped) appearance in a plan view. The connector 6 can thus be prevented from being damaged. In addition, in the first embodiment, for example, the connector 6 (or a support 61 thereof) has a face 6a (an outer face, an outside face, a face portion) positioned in a condition of being substantially joined to the face 2a of the first part 2A or retracted from the face 2a when the electronic device 1 is in the folded state. Thus, for example, in the first embodiment, the face 6a can be more easily prevented from being damaged in the folded state than in a case in which the face 6a of the connector 6 protrudes relative to the face 2a of the first part 2A.

For example, in the first embodiment, as illustrated in FIG. 2, the connector 6 generally extends along the end 2c (the pivot axis Ax, the first part 2A). In addition, for example, in the first embodiment, as illustrated in FIGS. 9 to 12, the connector 6 comprises the support 61, the protrusions 62, hooks 63a (a slider 63, a locking member), a lid member 64, a connector 65a (the connector unit 65), a base member 70, casings 71, 72, a cover 73, and the like.

For example, in the first embodiment, the support 61 comprises, for example, a first support 61A (a wall, a side wall), a second support 61B (a wall, a side wall), and a third support 61C (a base, a bottom portion). The first support 61A can support the face 3b (one face, a first face) of the housing 3 from the outside of the housing 3. The second support 61B can support the face 3a (the other face, a second face) of the housing 3 from the outside of the housing 3. Additionally, the third support 61C can support the face 3p (a third face) of the housing 3 from the outside of the housing 3. The first support 61A is formed into a quadrilateral shape (a rectangular shape extending along the end 2c) and a plate (wall) shape. The second support 61B is spaced away from, and extends substantially in parallel with, the first support 61A. The second support 61B is formed into a quadrilateral shape (a rectangular shape extending along the end 2c) and a plate (wall) shape. For example, in the first embodiment, the first support 61A has a height (a length protruding from the third support 61C) higher than a height (a length protruding from the third support 61C) of the second support 61B. Additionally, the third support 61C is formed into a tubular shape (a rectangular tubular shape, a hollow tubular shape) extending along the end 2c. The first support 61A protrudes from an end on a first side in a transverse direction of the third support 61C. The second support 61B protrudes from an end on a second side in the transverse direction of the third support 61C. The first support 61A, the third support 61C, and the second support 61B together exhibit a U-shape in a line of sight from a direction extending along the end 2c. Then, the device 1a (the housing 3) has a middle portion of the end 3e in the longitudinal direction inserted (housed) in a recess 6b (a housing portion, an insertion portion) surrounded by the first support 61A, the third support 61C, and the second support 61B. Specifically, with the device 1a connected to the connector 6, the middle portion of the end 3e in the longitudinal direction of the device 1a (the housing 3) is supported by at least one of the first support 61A, the second support 61B, and the third support 61C in a condition of being surrounded by the first support 61A, the second support 61B, and the third support 61C. Specifically, in the first embodiment, for example, with the housing 3 mounted in the connector 6, at least one of the first support 61A, the second support 61B, and the third support 61C contacts the housing 3. It is noted that the third support 61C may be configured so as not to be in direct contact with the housing 3.

The protrusions 62, the hooks 63a, and the connector 65a protrude from a bottom portion of the recess 6b into the recess 6b substantially along (substantially in parallel with) a direction in which the first support 61A and the second support 61B protrude. When the housing 3 is mounted on the connector 6, the protrusions 62 advance into the inside of the housing 3 via the opening 18 in the housing 3. The protrusions 62 abut against the housing 3 or a member fixed thereto inside the housing 3, which allows the protrusions 62 to prevent the housing 3 from moving in a direction that crosses a direction in which the protrusions 62 protrude (a direction in which the device 1a is to be mounted or removed) (the direction in which the housing 3 is prevented from moving is, for example, in the first embodiment a direction orthogonal to the direction in which the protrusions 62 protrude). Specifically, the protrusions 62 can serve a function of positioning the housing 3 in the direction orthogonal to the direction in which the protrusions 62 protrude. It is noted that the protrusions 62 can also serve a function of positioning the housing 3 in the direction in which the protrusions 62 protrude (the direction in which the device 1a is to be mounted). Alternatively, the protrusions 62 can even serve a function of guiding the housing 3 when the housing 3 is mounted on, or removed from, the connector 6.

When the housing 3 is mounted on the connector 6, the hooks 63a advance into the inside of the housing 3 via the openings 18 in the housing 3. The hooks 63a are engaged with the housing 3 or a member fixed thereto inside the housing 3, thereby preventing the housing 3 from being removed from the connector 6. Specifically, the hooks 63a can serve a function of locking the housing 3. The hooks 63a are configured so as to be movable between a position P1 at which the housing 3 is prevented from being removed (a position locking the housing 3, a first position; refer to FIGS. 12 and 18) and a position P2 at which the housing 3 is not prevented from being removed (a position unlocking the housing 3, a second position; refer to FIG. 17).

When the housing 3 is mounted on the connector 6, the connector 65a advances into the inside of the housing 3 via the opening 3t in the housing 3. The connector 65a is mechanically and electrically connected to the connector 15 of the device 1a inside the housing 3. The connection established between the connector 65a and the connector 15 of the device 1a enables transmission and reception of, for example, various types of data and electricity between the electric component of the device 1a (the housing 3) and the electric component of the device 1b (the housing 2).

Additionally, for example, in the embodiment, as illustrated in FIGS. 9 to 12, the first support 61A and the second support 61B each comprise a skeleton 61a, a shell 61b, and a protector 61c. The skeleton 61a constitutes walls 70a, 70b (a first portion) of the base member 70.

The shell 61b constitutes walls 71a, 72a (a third portion) of the casings 71, 72. The casings 71, 72 are formed into bent plates and cover a side opposite the recess 6b in the skeleton 61a (outside the skeleton 61a). The casings 71, 72 may be formed of, for example, a synthetic resin material or an elastomer. The casings 71, 72 can be fixed to the skeleton 61a using, for example, a fastener (a screw, a clip, a rivet, or the like; for example, a screw, in the embodiment; not illustrated).

The protector 61c constitutes the cover 73. The cover 73 is formed into a slender quadrilateral shape (a rectangular shape extending along the end 2c) and covers the side of the recess 6b in the skeleton 61a. The cover 73 is an elastic or flexible, thin sheet member. The cover 73 can be formed of, for example, a felt, elastomer, or synthetic resin material. The cover 73 can be fixed to the skeleton 61a through, for example, bonding.

For example, in the first embodiment, the third support 61C comprises a skeleton 61d, a shell 61e, and the lid member 64. The skeleton 61d constitutes the walls 70a, 70b (side walls) and a wall 70c (a bottom wall) of the base member 70. The shell 61e constitutes walls 71b, 72b of the casings 71, 72, respectively. The skeleton 61d and the shell 61e exhibit a U-shape in the line of sight from the direction extending along the end 2c. This U-shaped area is covered with the lid member 64 spaced apart from the bottom portion to thereby form the rectangular tubular third support 61C. A space S surrounded by the walls 70a, 70b, 70c is disposed inside the third support 61C. The space S houses therein, for example, a wall 63b of the slider 63 and a circuit board 65b of the connector unit 65. Additionally, the wall 70b is divided in the longitudinal direction. An opening 70h is formed between the two walls 70b (protruding portions). In the first embodiment, the opening 70h is for example a rectangular cutout; nonetheless, the opening 70h may instead be a through hole. The opening 70h is covered in the wall 72a of the casing 72. In addition, the wall 72a of the casing 72 has an opening 72c that overlaps the opening 70h. In the first embodiment, the opening 72c is for example a slot-shaped through hole extending along the end 2c (in the longitudinal direction of the connector 6). An operating portion 68 that moves the slider 63 is exposed through the opening 72c. Additionally, the second support 61B has an opening 6c (a fourth opening) formed at a central portion in the longitudinal direction and an end (a leading end) in a transverse direction thereof. In the first embodiment, the opening 6c is for example a rectangular cutout; nonetheless, the opening 6c may instead be a through hole. A portion of the device 1a (the housing 3) mounted on the connector 6 is exposed through the opening 6c. Specifically, for example, a pushbutton (not illustrated) disposed on the end 3e of the housing 3 or part (an input operating portion) of the touch panel 5 may be exposed.

For example, in the embodiment, the protrusions 62 (protruding portions, guide portions) constitute protuberances 70e (a second portion) that protrude from walls 70d (intermediate walls; see FIGS. 13 and 14) of the base member 70. The walls 70d are spaced apart from the wall 70c (the bottom wall) in a direction in which the walls 70a, 70b protrude and extend substantially in parallel with the wall 70c. The protuberances 70e extend substantially in parallel with the walls 70a, 70b. The protuberances 70e are each a quadrilateral plate shape. It is noted that the protrusions 62 can comprise a conductor (a terminal) that has ground potential common to that of the connector 6 (and the housing 2 (the device 1b)) and the housing 3 (the device 1a). Additionally, the protrusions 62 may contain an element different from that found in the protuberances 70e. The protrusions 62 are not connectors.

For example, in the embodiment, the base member 70 comprises, as illustrated in FIGS. 11 to 14, the walls 70a to 70d, the protuberances 70e, and protuberances 70f. In the embodiment, for example, the base member 70 is a casting (cast) component (a die cast component) manufactured through casting (diecasting) of an aluminum alloy, a magnesium alloy, or other metallic material. Thus, in the embodiment, for example, stiffness, strength, dimensional accuracy, and the like tend to be enhanced compared with a case in which the walls 70a to 70d and the protuberances 70e, 70f are formed with a different material.

Figure 14:
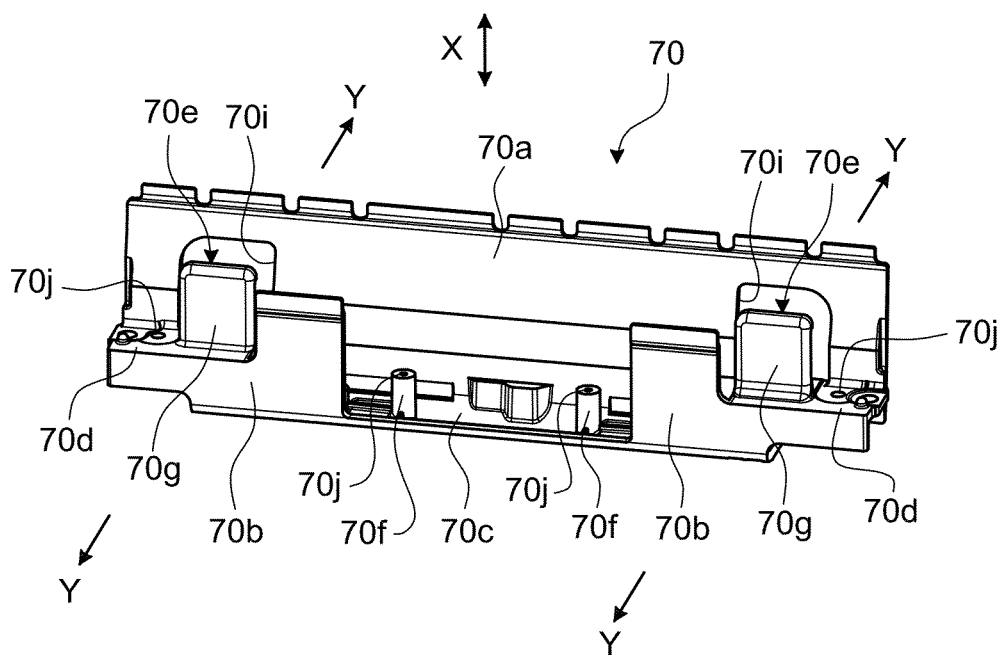
FIG. 14 is an exemplary perspective view of a base member comprised in the connector of the electronic device in the embodiment.

In addition, for example, in the embodiment, a mold for molding the protuberances 70e is set to have a draft direction that crosses a direction in which the device 1a (the housing 3)

is detached or attached (in the vertical direction in FIGS. 9 to 12; the direction in which the protuberances 70e protrude; the X direction in FIG. 14). For example, in the embodiment, the draft direction is set to be a direction orthogonal to the direction in which the protuberances 70e protrude (a thickness direction of the connector 6 (the first support 61A and the second support 61B); the Y direction in FIG. 14). If the draft direction of the mold for molding the protuberances 70e extends in the direction in which the device 1a is detached or attached, a draft angle occurs on a face 70g (a side face) of the protuberance 70e. The draft angle then causes the protuberance 70e to tend to be formed into a taper that is thinner toward a leading end side thereof. It is here noted that the protuberances 70e (the protrusions 62) are inserted in the openings 18 in the housing 3 of the device 1a and supported by the housing 3 or a member (not illustrated) fixed to the housing 3. Accordingly, if the protuberances 70e are tapered to be thinner toward the leading end side thereof, play in the device 1a (the housing 3) tends to be large with the device 1a connected to the connector 6. In this respect, in the embodiment, for example, the draft angle along the direction in which the device 1a (the housing 3) is mounted or removed does not tend to occur in the protuberances 70e, which causes play in the device 1a (the housing 3) to be smaller. In addition, in the embodiment, for example, the wall 70a (a first portion) has openings 70i (third openings) formed therein. The openings 70i face the protuberances 70e and the draft direction of the mold for molding the protuberances 70e (specifically, in the embodiment, for example, in the thickness direction of the connector 6). The openings 70i thus have outer edges positioned outside outer edges of the protuberances 70e in a line of sight from the draft direction. Consequently, the openings 70i can be used during molding as openings through which the mold (e.g., a slide mold) for molding the protuberances 70e is inserted.

Figure 20:
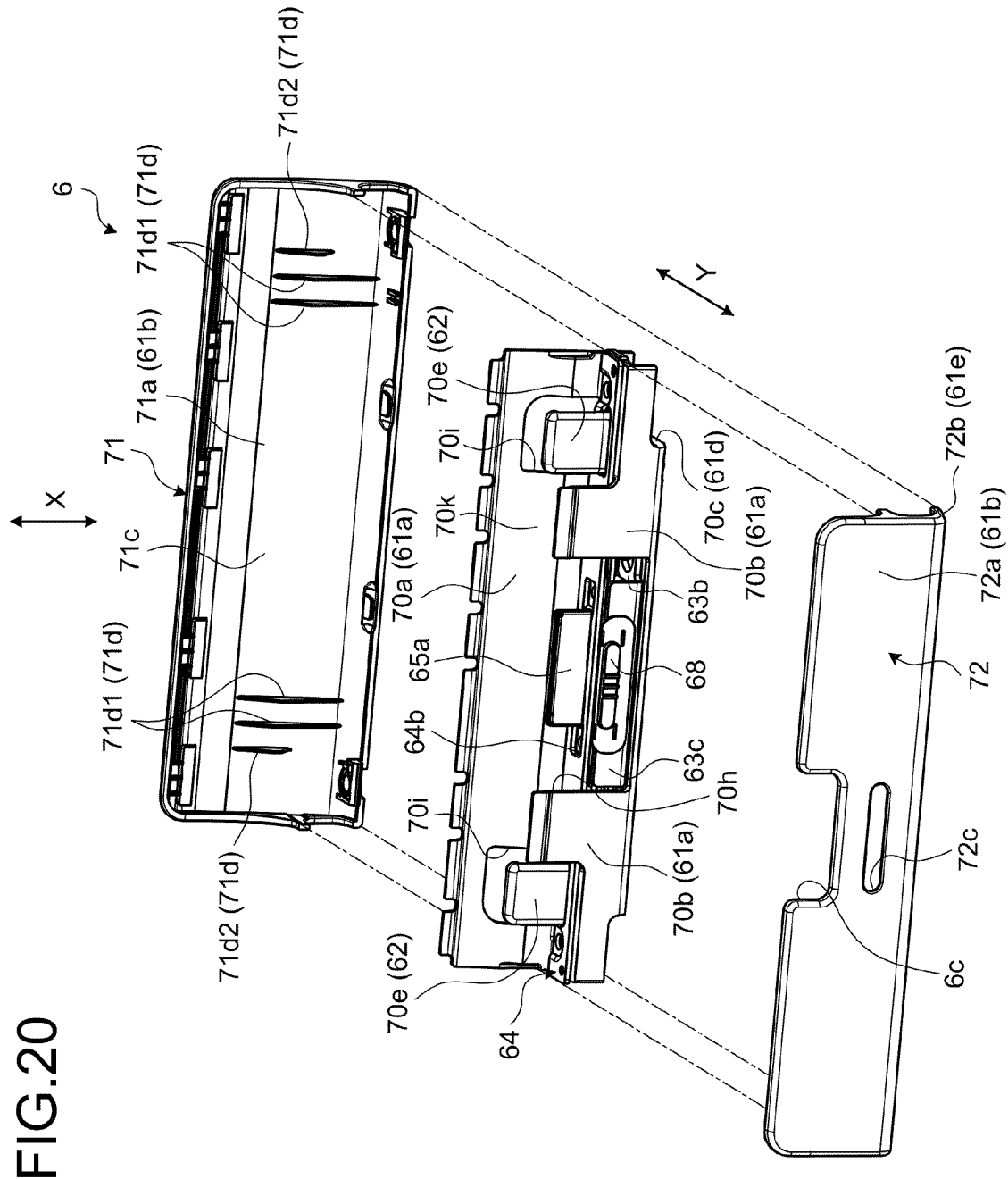
FIG. 20 is an exemplary partial exploded perspective view of the connector of the electronic device in the embodiment.

For example, in the embodiment, as illustrated in FIG. 20, the wall 71a (a third portion) of the casing 71 has protuberances 71d (protruding portions, walls, ribs). The protuberances 71d are formed on a face 71c (an inner face, an inside face, a face portion) on the recess 6b side of the wall 71a and protrude from the face 71c. In the embodiment, the (for example in the embodiment, three) protuberances 71d are spaced apart from each other in the longitudinal direction of the wall 71a (along the end 2c). Each of the protuberances 71d has a substantially predetermined width and extends in a transverse direction of the wall 71a (in the direction in which the device 1a (the housing 3) is detached or attached; the X direction in FIG. 20). The three protuberances 71d extend substantially in parallel with each other. Of the protuberances 71d, the protuberance 71d2 disposed on the outside in the longitudinal direction of the wall 71a (along the end 2c) is shorter in length than the protuberance 71d1. The protuberances 71d are disposed on the wall 71a at positions overlapping the openings 70i in the above-described draft direction (in the thickness direction of the connector 6; the Y direction in FIG. 20). Thus, the protuberances 71d protrude (fit) into the openings 70i when the casing 71 is integrated with the skeleton 61a (the wall 70a). The protuberances 71d may be disposed such that their vertices (protruding surfaces, leading end surfaces) are (shaped to be) substantially continuous with a face 70k (an inner surface, an inside surface, a surface portion, a surface on the recess 6b side) of the wall 70a. The protuberances 71d, being positioned in the openings 70i, can support areas not supported by the face 70k of the cover 73 (areas overlapping the openings 70i). Thus, for example, the cover 73 can be more easily prevented from being deformed. Additionally, the protuberances 71d can support the device 1a (the housing 3) via the cover 73. Thus, for example, the device 1a (the housing 3) can be easily and reliably supported by the support 61. In addition, the protuberances 71d abut against the wall 70a at peripheral edge portions of the openings 70i, to thereby prevent the casing 71 from moving in the longitudinal direction of the base member 70 (along the end 2c). Specifically, protuberances 71d can also function as a portion that positions the casing 71 in the longitudinal direction of the base member 70 (along the end 2c). It is noted that the protuberances 71d may be disposed such that at least part of their vertices (the protruding faces, the leading end faces) protrudes to the recess 6b side from the face 70k. Additionally, the wall 71a and the protuberances 71d can be disposed relatively movably (elastically deformably) in their thickness direction relative to the wall 70a. In an arrangement such as that described above, the wall 71a and the protuberances 71d can support the housing 3 (the device 1a) that has advanced into the recess 6b in a condition of pressing elastically. The wall 71a and the protuberances 71d can thus clamp the device 1a (the housing 3) against the wall 70b that faces the protuberances 71d. Thus, in the foregoing arrangements, for example, the device 1a (the housing 3) can be even more steadily connected (supported). Additionally, for example, the face 3b of the housing 3 and the face 70k of the wall 70a are not likely to contact even harder each other, so that the face 70k can be prevented from being damaged.

Figure 13:
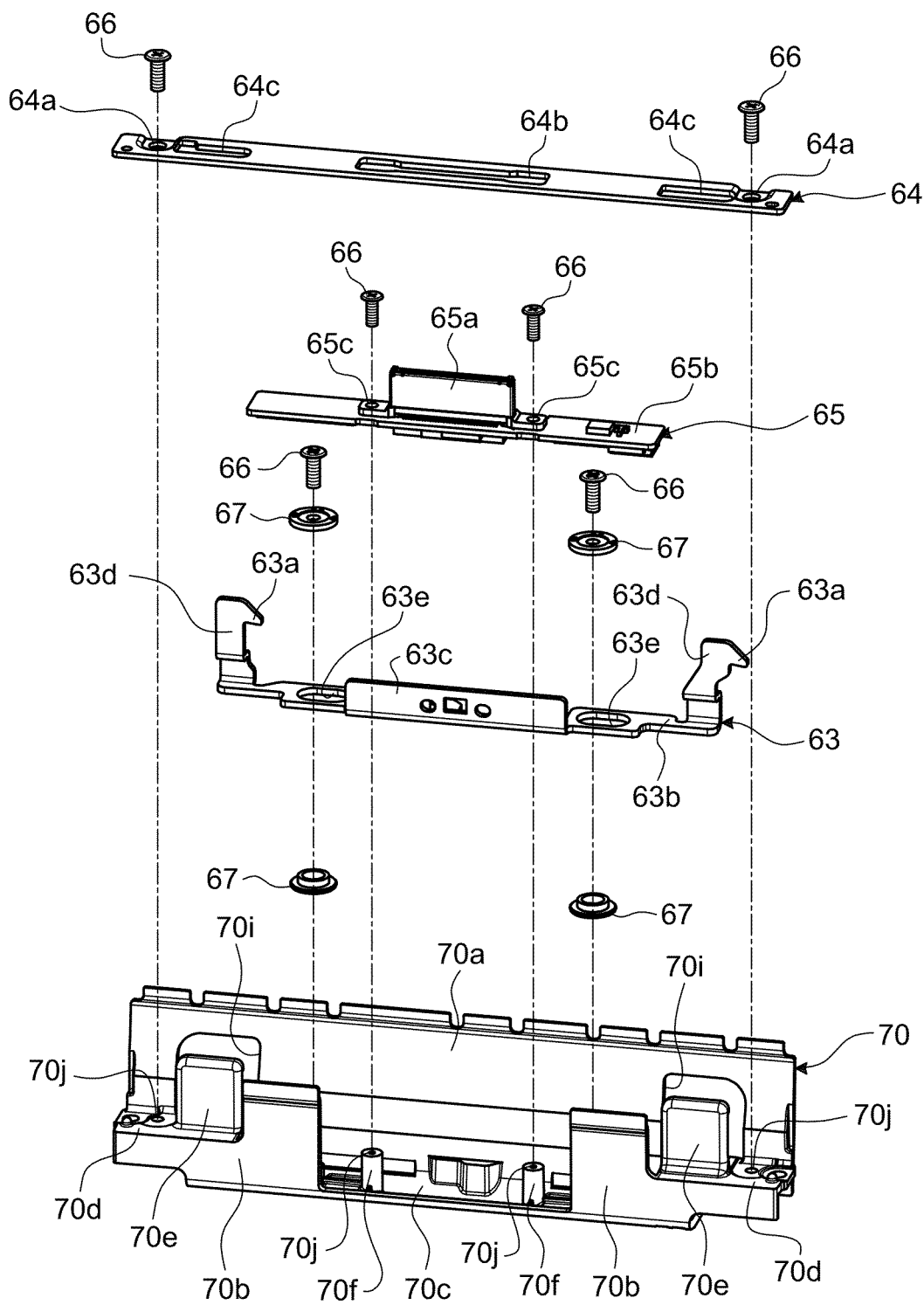
FIG. 13 is an exemplary partial exploded perspective view of the internal structure comprised in the connector of the electronic device in the embodiment.

Reference is now made to FIG. 13. For example, in the first embodiment, the base member 70, the slider 63, the lid member 64, and the connector unit 65 that constitute the connector 6 are connected to each other by couplers 66 (for example, in the first embodiment, screws). The lid member 64 and the circuit board 65b of the connector unit 65 are each spaced away from, and extend substantially in parallel with, the wall 70c. The lid member 64 and the circuit board 65b are each formed into a slender plate shape extending along the end 2c. The lid member 64 and the connector unit 65 are fixed to the base member 70 with the couplers 66. Specifically, the couplers 66 that fix the lid member 64 pass through openings 64a formed in the lid member 64 and are coupled to coupling portions 70j (for example in the first embodiment, female threaded holes) formed in the wall 70d. The couplers 66 that fix the connector unit 65 pass through openings 65c formed in the connector 65a and the circuit board 65b and are coupled to coupling portions 70j (for example in the first embodiment, female threaded holes) formed in the protuberances 70f (coupling boss portions) that protrude from the wall 70c. For coupling (fixing) these parts, another type of couplers, such as clips and rivets, may be used instead of the screws. The connector 65a passes through a slit-shaped opening 64b formed in the lid member 64 to protrude into the recess 6b. Arms 63d pass through slit-shaped openings 64c formed in the lid member 64 to protrude into the recess 6b.

Figure 15:
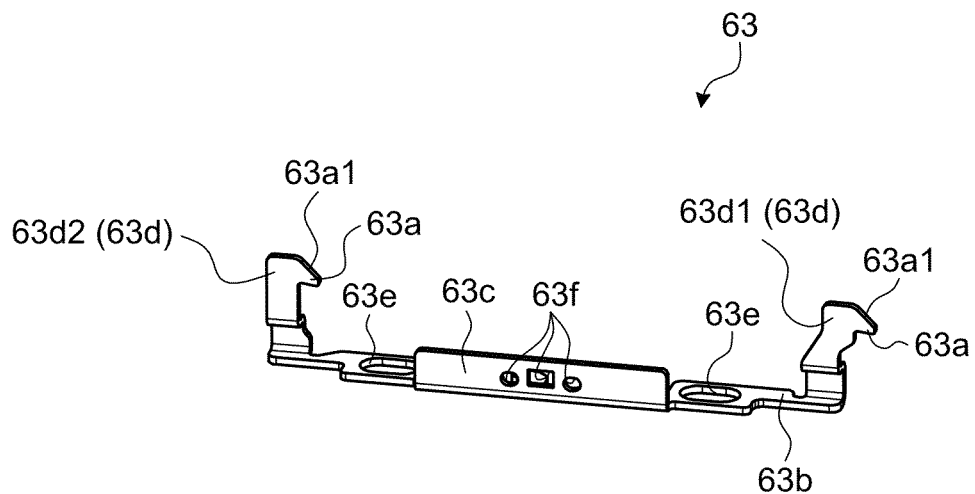
FIG. 15 is an exemplary perspective view of a slider comprised in the connector of the electronic device in the embodiment.
Figure 16:
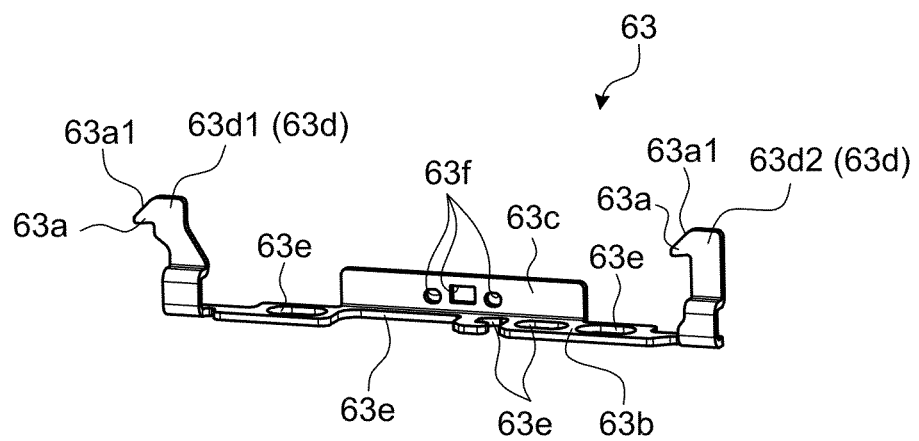
FIG. 16 is an exemplary perspective view of the slider comprised in the connector of the electronic device when viewed from an angle different from an angle of view of FIG. 15, in the embodiment.

For example, in the embodiment, as illustrated in FIGS. 15 and 16, the slider 63 comprises the wall 63b, a wall 63c, the arms 63d (63d1, 63d2), and the hooks 63a. The slider 63 also has openings 63e through which other parts pass through. The wall 63b is formed into a slender plate shape extending along the end 2c (in the longitudinal direction of the connector 6). As illustrated in FIG. 13, the couplers 66 that pass through the slit-shaped openings 63e are coupled to coupling parts (for example in the embodiment, female threaded holes; not illustrated) formed in the wall 70c of the base member 70. This attaches the slider 63 to the base member 70. The couplers 66 pass through the openings 63e and rings 67 (seats, retainers) disposed on each of obverse and reverse sides of the wall 63b. Specifically, the wall 63b is connected to the wall 70c in a condition of being sandwiched between the two rings 67. As compared with a case having no rings 67, the slider 63 may be more easily movable (slidable). The rings 67 can be formed of an elastomer or synthetic resin material.

As illustrated in FIGS. 15 and 16, the wall 63c protrudes from an end in a transverse direction (a width direction) at an intermediate position of the wall 63b in a longitudinal direction (along the end 2c). The wall 63c crosses the wall 63b (for example in the embodiment, extends orthogonally thereto). The wall 63c is a quadrilateral plate shape. Additionally, the wall 63c has openings 63f. The openings 63f are used for fixing (coupling) the operating portion 68 to the wall 63c.

The arms 63d protrude from ends in the transverse direction at ends in the longitudinal direction of the wall 63b. The arms 63d cross the wall 63b. Additionally, the arms 63d are bent (cranked). The hook 63a is disposed at a lending end portion of the arm 63d. The hook 63a extends orthogonally to the arm 63d to protrude in a direction along the end 2c (toward a first side in a moving direction of the slider 63). The arm 63d and the hook 63a are plate-shaped. Through an operation on the operating portion 68 (see FIG. 9, for example) by a user's finger, the slider 63 is moved relative to the connector 6 along the end 2c (in the longitudinal direction of the connector 6 and the slider 63). This causes the hooks 63a to move (slide) at least between the position P1 at which the housing 3 is prevented from being removed (the position locking the housing 3; the first position; refer to FIGS. 12 and 18) and the position P2 at which the housing 3 is not prevented from being removed (the position unlocking the housing 3; the second position; refer to FIG. 17).

Figure 17:
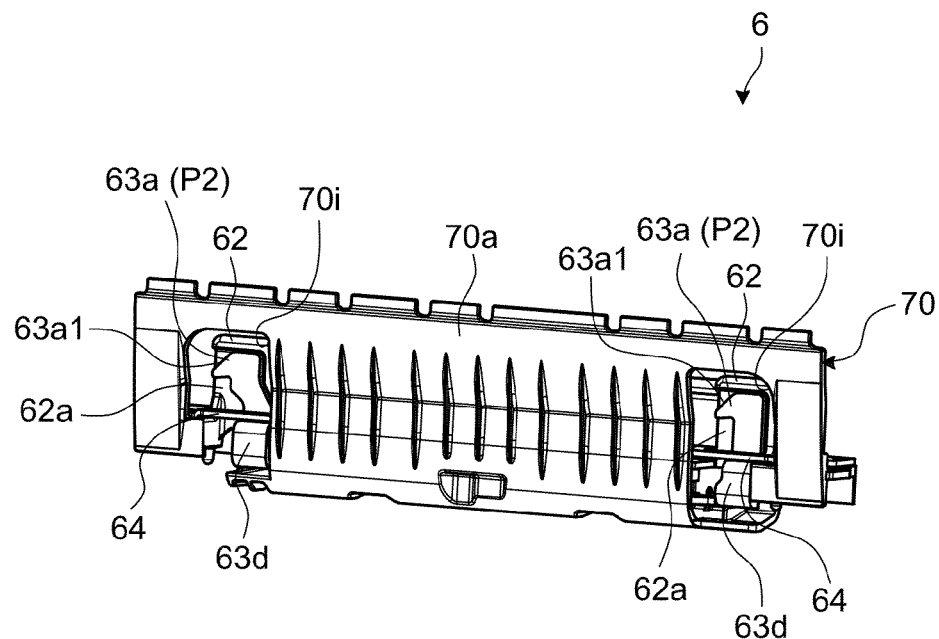
FIG. 17 is an exemplary partial perspective view of the internal structure comprised in the connector of the electronic device when viewed from an angle different from the angle of view of FIG. 11, and illustrating a condition in which the hook is housed in an opening, in the embodiment.
Figure 18:
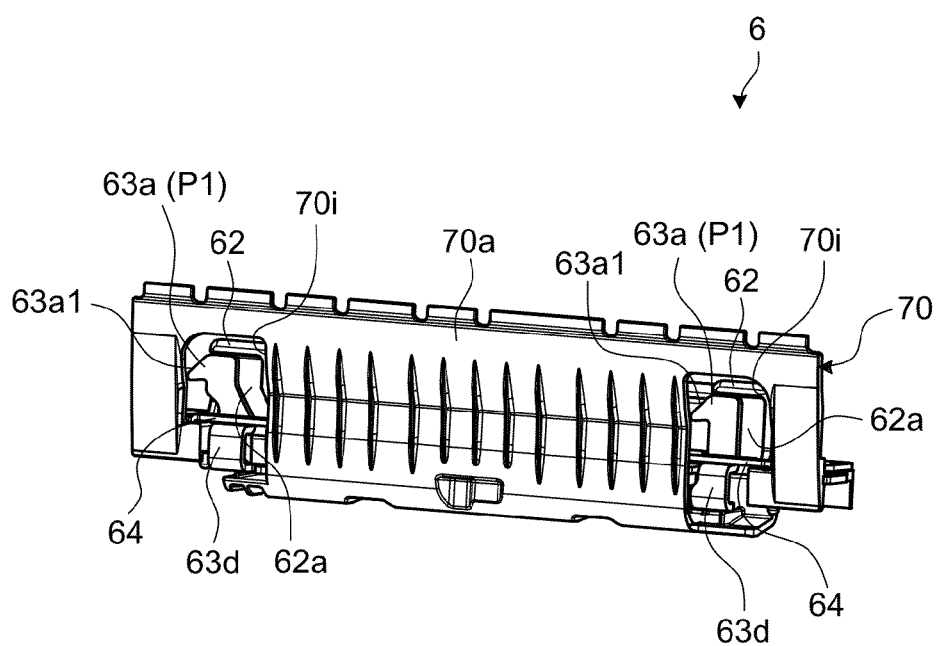
FIG. 18 is an exemplary partial perspective view of the internal structure comprised in the connector of the electronic device when viewed from an angle different from the angle of view of FIG. 12, and illustrating a condition in which the hook is housed in the opening, in the embodiment.
Figure 19:
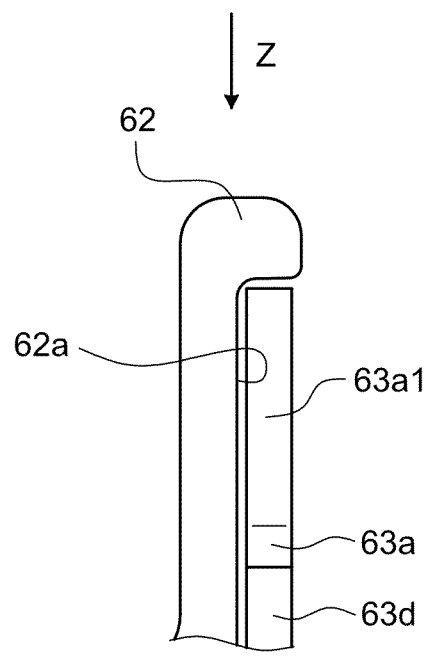
FIG. 19 is an exemplary side view of a protrusion and the hook comprised in the connector of the electronic device in the embodiment.

For example, in the embodiment, as illustrated in FIGS. 17 to 19, the hooks 63a (the arms 63d) and the protrusions 62 overlap each other in their thickness direction (in the thickness direction of the connector 6). For example, in the embodiment, the foregoing arrangement eliminates the need for having openings in which the protrusions 62 are inserted and openings in which the hooks 63a (the arms 63d) are inserted separately from each other in the housing 3. Thus, for example, the openings can be prevented from being large in size or increasing in number. In addition, for example, labor and cost for having the openings can be easily reduced.

For example, in the embodiment, as illustrated in FIGS. 17 to 19, the protrusions 62 have recesses 62a (housing portions, second openings) in which the hooks 63a (the arms 63d) are housed. Specifically, with the hooks 63a positioned at either one or both of the position P1 and the position P2, at least part of the hooks 63a (the arms 63d) is covered in the protrusions 62. This tends to prevent the housing 3 (the device 1a) from abutting on (interfering with) the hooks 63a, should the housing 3 advance into the recess 6b in the connector 6, being out of a mounting position. Thus, for example, in the embodiment, the hooks 63a can be easily protected by the protrusions 62. In the embodiment, for example, as illustrated in FIG. 19, the hooks 63a (the arms 63d) are covered in the protrusions 62 in a line of sight from a direction in which the device 1a (the housing 3) is mounted on the connector 6 (the arrow Z in FIG. 19). In addition, as illustrated in FIGS. 15 to 19, the hooks 63a each have a slope 63a1 at a leading end portion thereof. The slope 63a1 causes the hook 63a to be retracted (moved to the position P2) by a force pushed by the housing 3 when the housing 3 is moved in the direction in which the housing 3 is mounted on the connector 6 (in which the housing 3 approaches the wall 70c). As evident from FIGS. 17 and 18, with the hooks 63a in the protruded position (positioned at the position P1), the slopes 63a1 protrude from the protrusions 62 and portions other than the slopes 63a1 are covered in the protrusions 62. Thus, for example, in the embodiment, because the housing 3 that has advanced into the recess 6b in the connector 6 does not abut against any part of the hooks 63a other than the slopes 63a1, the hooks 63a (the arms 63d) are less likely to be damaged. It is noted that the slider 63 is pushed in a direction in which the hooks 63a protrude (toward the position P1) by an elastic member (an urging member; e.g., a coil spring) not illustrated. Thus, when the housing 3 advances all the way into the recess 6b in the connector 6, the slider 63 is pushed by the elastic member, which allows the hooks 63a to be moved to the position P1. To remove the housing 3, the user operates the operating portion 68 to thereby move the slider 63, so that the hooks 63a can be moved from the position P1 to the position P2.

As described above, in the embodiment, for example, the walls 70a, 70b (first portions) that constitute at least a portion (the skeleton 61a) of the support 61 and the protuberances 70e (second portions) that constitute at least a portion of the protrusions 62 are integrated with each other (formed of a single member). Thus, in the embodiment, for example, the connector 6 can have enhanced stiffness and strength as compared with a case in which the support 61 and the protrusions 62 are each formed of a unique member. Additionally, for example, dimensional accuracy between the support 61 and the protrusions 62 tends to be enhanced. Thus, for example, the device 1a (the housing 3) can be more steadily connected to (supported by) the connector 6.

In the embodiment, for example, the protrusions 62 are each formed into a quadrilateral plate shape. Thus, in the embodiment, for example, the protrusions 62 can have enhanced stiffness and strength as compared with a case in which the protrusions 62 are each formed into a pin or a column.

In the embodiment, for example, the hooks 63a (the arms 63d) and the protrusions 62 overlap each other. Thus, in the embodiment, for example, the foregoing arrangement eliminates the need for having openings in which the protrusions 62 are inserted and openings in which the hooks 63a (the arms 63d) are inserted separately from each other in the housing 3.

In the embodiment, for example, the protrusions 62 have the recesses 62a (second openings) in which the hooks 63a are housed. Thus, in the embodiment, for example, the hooks 63a tend to be protected by the protrusions 62.

In the embodiment, for example, the base member 70 is formed of a casting. Thus, in the embodiment, for example, stiffness, strength, and dimensional accuracy of the base member 70 tend to be enhanced.

In the embodiment, for example, a mold for molding the protrusions 62 is set to have a draft direction that crosses a direction in which the housing 3 (the second housing) is mounted on, or removed from, the connector 6. Thus, in the embodiment, for example, a draft angle along the direction in which the housing 3 is detached or attached can be easily prevented from occurring on the protrusions 62. Thus, for example, play in the device 1a (the housing 3) coupled to (connected to, supported on) the connector 6 tends to be prevented.

In the embodiment, for example, the wall 70a (a first portion) has openings 70i (third openings) formed at positions that face the protrusions 62 and the draft direction. Thus, in the embodiment, for example, the protrusions 62 can be more easily molded during casting by a slide mold that passes through the openings 70i.

In the embodiment, for example, the wall 71a (a third portion) has protuberances 71d that protrude into the openings 70i (third openings) to thereby support the housing 3 (a second housing). Thus, in the embodiment, for example, the device 1a (the housing 3) tends to be more firmly supported by the support 61.

In the embodiment, for example, the support 61 comprises the first support 61A that supports the face 3*b* (a first face) of the housing 3 and the second support 61B that supports the face 3*a* (a second face) of the housing 3. Thus, in the embodiment, for example, the device 1*a* (the housing 3) tends to be even more steadily connected by the connector 6.

In the embodiment, for example, the support 61 has the opening 6*c* (a fourth opening) formed in at least a portion thereof. A portion of the device 1*a* (the housing 3) is exposed through the opening 6*c*. Thus, in the embodiment, for example, the user can more easily operate the input operating portion of the housing 3.

In addition, the elements may be partially replaced with each other among different embodiments and modifications. Furthermore, the specifications (e.g., structure, type, direction, shape, size, length, width, thickness, height, quantity used, disposition, position, material) of each element may be changed as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stand for an electronic device, comprising:
   a first housing; and
   a connector configured to detachably connect to the electronic device and to be rotatably supported by the first housing, the electronic device comprising a display face and a second housing, the second housing comprising a first opening formed at an end thereof,
   wherein the connector comprises
      a support configured to support the second housing from outside of the second housing,
      a protrusion spaced from the support and inserted into the first opening,
      a base member comprising a first part being at least a portion of the support and a second part integrated with the first part and being at least a portion of the protrusion, the first part comprises a second opening formed at a position facing the protrusion and the second part formed in accordance with a draft direction, the draft direction crossing a direction in which the second housing is detached with respect to the connector.

2. The stand of claim 1, wherein the protrusion has a quadrilateral plate shape.

3. The stand of claim 1, wherein
   the connector comprises a hook movable between a first position at which the second housing is locked and a second position at which the second housing is unlocked, the hook overlapping the protrusion.

4. The stand of claim 3, wherein the protrusion comprises a third opening in which the hook is housed.

5. The stand of claim 1, wherein
   the support comprises a third part covering the first part, and
   the third part comprises a protuberance that protrudes into the second opening to support the second housing.

6. The stand of claim 1, wherein the support comprises a first support configured to support a first face of the second housing and a second support configured to support a second face opposite the first face.

7. The stand of claim 1, wherein the support has a third opening formed in at least a portion of the support, the third opening exposing a portion of the housing.

8. An electronic device comprising:
   a first housing;
   a connector configured to be rotatably supported by the first housing;
   a second housing comprising a first opening formed at an end thereof, and detachably connected to the connector; and
   a display configured to be supported by the second housing, the display comprising a display surface,
   wherein the connector comprises:
      a support configured to support the second housing from outside of the second housing,
      a protrusion spaced from the support and inserted into the first opening,
      a base member comprising a first part being at least a portion of the support and a second part integrated with the first part and being at least a portion of the protrusion, the first part comprises a second opening formed at a position facing the protrusion and the second part formed in accordance with a draft direction, the draft direction crossing a direction in which the second housing is detached with respect to the connector.

9. The electronic device of claim 8, wherein the protrusion of the connector has a quadrilateral plate shape.

10. The electronic device of claim 8, wherein the connector further comprises a hook that is movable between a first position at which the second housing is locked and a second position at which the second housing is unlocked, the hook being positioned to overlap the protrusion.

11. The electronic device of claim 10, wherein the protrusion of the connector comprises a third opening in which the hook is housed.

12. The electronic device of claim 8, wherein the support has a third opening formed in at least a portion of the support, the third opening exposing a portion of the housing.

* * * * *